(12) United States Patent
Miller

(10) Patent No.: US 10,489,286 B2
(45) Date of Patent: *Nov. 26, 2019

(54) DRIVING A WEB BROWSER FOR TESTING WEB PAGES USING A DOCUMENT OBJECT MODEL

(71) Applicant: Edward F. Miller, San Francisco, CA (US)

(72) Inventor: Edward F. Miller, San Francisco, CA (US)

(73) Assignee: Software Research, Inc., San Francisco, CA (US)

( * ) Notice: Subject to any disclaimer, the term of this patent is extended or adjusted under 35 U.S.C. 154(b) by 139 days.

This patent is subject to a terminal disclaimer.

(21) Appl. No.: 14/657,955

(22) Filed: Mar. 13, 2015

(65) Prior Publication Data

US 2015/0186249 A1 Jul. 2, 2015

Related U.S. Application Data

(63) Continuation of application No. 13/922,579, filed on Jun. 20, 2013, now Pat. No. 8,984,491, which is a continuation of application No. 13/764,628, filed on Feb. 11, 2013, now Pat. No. 8,495,585, and a continuation of application No. 12/247,753, filed on Oct. 8, 2008, now Pat. No. 8,392,890.

(Continued)

(51) Int. Cl.
| | |
|---|---|
| *G06F 11/36* | (2006.01) |
| *G06F 16/958* | (2019.01) |
| *H04L 29/06* | (2006.01) |
| *G06F 17/22* | (2006.01) |

(52) U.S. Cl.
CPC ...... *G06F 11/3696* (2013.01); *G06F 11/3668* (2013.01); *G06F 11/3688* (2013.01); *G06F 16/958* (2019.01); *G06F 17/2247* (2013.01); *H04L 67/42* (2013.01)

(58) Field of Classification Search
CPC .................................................. G06F 11/3668
USPC ......................................................... 717/125
See application file for complete search history.

(56) References Cited

U.S. PATENT DOCUMENTS

| | | |
|---|---|---|
| 5,416,900 A | 5/1995 | Blanchard |
| 5,561,763 A | 10/1996 | Eto |

(Continued)

FOREIGN PATENT DOCUMENTS

WO    WO 01/10082 A2    2/2001

OTHER PUBLICATIONS

Author Unknown, "jQuery: New Wave Javascript", Feb. 3, 2006, jquery.com, accessed on Apr. 19, 2019 via <web.archive.org/web/20060203025710/http://jquery.com/> (Year: 2006).*

(Continued)

*Primary Examiner* — James D. Rutten

(57) ABSTRACT

Methods and systems to test web browser enabled applications are disclosed. In one embodiment, a browser application can allow a user to perform test and analysis processes on a candidate web browser enabled application. The test enabled browser can use special functions and facilities that are built into the test enabled browser. One implementation of the invention pertains to functional testing, and another implementation of the invention pertains to pertains to site analysis.

29 Claims, 5 Drawing Sheets

Related U.S. Application Data

(60) Provisional application No. 60/980,068, filed on Oct. 15, 2007.

(56) References Cited

U.S. PATENT DOCUMENTS

| | | | |
|---|---|---|---|
| 5,642,504 A | 6/1997 | Shiga | |
| 5,870,559 A | 2/1999 | Leshem | |
| 5,974,572 A | 10/1999 | Weinberg et al. | |
| 6,002,871 A | 12/1999 | Duggan et al. | |
| 6,044,395 A | 3/2000 | Costales | |
| 6,044,398 A | 3/2000 | Marullo et al. | |
| 6,138,157 A | 10/2000 | Welter et al. | |
| 6,151,599 A | 11/2000 | Shrader et al. | |
| 6,157,940 A | 12/2000 | Marullo et al. | |
| 6,185,701 B1 | 2/2001 | Marullo et al. | |
| 6,393,479 B1 | 5/2002 | Glommen et al. | |
| 6,418,544 B1 | 7/2002 | Nesbitt et al. | |
| 6,421,070 B1 | 7/2002 | Ramos et al. | |
| 6,446,120 B1 | 9/2002 | Dantressangle | |
| 6,522,995 B1 | 2/2003 | Conti et al. | |
| 6,549,944 B1 | 4/2003 | Weinberg et al. | |
| 6,587,969 B1 | 7/2003 | Weinberg et al. | |
| 6,601,020 B1 | 7/2003 | Myers | |
| 6,662,217 B1 | 12/2003 | Godfrey et al. | |
| 6,684,204 B1 | 1/2004 | Lal | |
| 6,741,967 B1 | 5/2004 | Wu et al. | |
| 6,754,701 B1 | 6/2004 | Kessner | |
| 6,754,847 B2 | 6/2004 | Dalal et al. | |
| 6,775,644 B2 | 8/2004 | Myers | |
| 6,810,494 B2 | 10/2004 | Weinberg et al. | |
| 6,865,599 B2* | 3/2005 | Zhang | H04L 51/04 709/218 |
| 6,918,066 B2 | 7/2005 | Dutta et al. | |
| 6,920,608 B1 | 7/2005 | Davis | |
| 6,954,922 B2 | 10/2005 | Liang | |
| 6,993,748 B2 | 1/2006 | Schaefer | |
| 7,000,224 B1 | 2/2006 | Osborne, II et al. | |
| 7,013,251 B1 | 3/2006 | Nace et al. | |
| 7,043,546 B2 | 5/2006 | Smith et al. | |
| 7,072,935 B2 | 7/2006 | Kehoe et al. | |
| 7,231,606 B2 | 6/2007 | Miller et al. | |
| 7,299,457 B2 | 11/2007 | Marshall | |
| 7,313,595 B2 | 12/2007 | Rust | |
| 7,316,003 B1 | 1/2008 | Dulepet et al. | |
| 7,337,349 B2 | 2/2008 | Braunels et al. | |
| 7,363,616 B2 | 4/2008 | Kalyanaraman | |
| 7,426,513 B2 | 9/2008 | Gvily | |
| 7,454,659 B1 | 11/2008 | Gaudette et al. | |
| 7,461,346 B2 | 12/2008 | Fildebrandt | |
| 7,752,326 B2 | 7/2010 | Smit | |
| 7,757,175 B2 | 7/2010 | Miller et al. | |
| 7,849,162 B2 | 12/2010 | Davis et al. | |
| 7,934,201 B2 | 4/2011 | Sweis | |
| 8,032,626 B1 | 10/2011 | Russell et al. | |
| 8,095,882 B2 | 1/2012 | Kashi | |
| 8,327,271 B2 | 12/2012 | Miller | |
| 8,352,917 B2 | 1/2013 | Wong et al. | |
| 8,392,890 B2 | 3/2013 | Miller | |
| 8,495,585 B2 | 7/2013 | Miller | |
| 8,650,493 B2 | 2/2014 | Miller et al. | |
| 8,683,447 B2 | 3/2014 | Miller et al. | |
| 8,719,451 B1* | 5/2014 | Colton | G06F 17/3089 709/248 |
| 8,984,491 B2 | 3/2015 | Miller et al. | |
| 2002/0035498 A1 | 3/2002 | Kehoe et al. | |
| 2002/0038388 A1* | 3/2002 | Netter | G06F 9/4443 719/318 |
| 2002/0109717 A1 | 8/2002 | Li et al. | |
| 2002/0138226 A1 | 9/2002 | Doane | |
| 2002/0194388 A1 | 12/2002 | Boloker | |
| 2003/0005044 A1 | 1/2003 | Miller et al. | |
| 2003/0053420 A1 | 3/2003 | Duckett et al. | |
| 2003/0229900 A1 | 12/2003 | Reisman | |
| 2004/0010587 A1 | 1/2004 | Altamirano et al. | |
| 2004/0039550 A1 | 2/2004 | Myers | |
| 2004/0044966 A1* | 3/2004 | Malone | G06F 17/24 715/255 |
| 2004/0054728 A1 | 3/2004 | Rust | |
| 2004/0111488 A1 | 6/2004 | Allan | |
| 2004/0148173 A1 | 7/2004 | Wu | |
| 2004/0177327 A1 | 9/2004 | Kieffer | |
| 2004/0261026 A1 | 12/2004 | Corson | |
| 2005/0022116 A1* | 1/2005 | Bowman | G06F 17/30896 715/234 |
| 2005/0166094 A1 | 7/2005 | Blackwell et al. | |
| 2005/0203902 A1 | 9/2005 | Davis et al. | |
| 2005/0246153 A1 | 11/2005 | Genkin et al. | |
| 2006/0005066 A1 | 1/2006 | Brauneis et al. | |
| 2006/0031663 A1 | 2/2006 | Peller et al. | |
| 2006/0048214 A1 | 3/2006 | Watkins | |
| 2006/0059462 A1* | 3/2006 | Yamamoto | G06F 17/30861 717/115 |
| 2006/0069961 A1 | 3/2006 | Kalyanaraman | |
| 2006/0101404 A1 | 5/2006 | Popp et al. | |
| 2007/0006036 A1 | 1/2007 | Devas et al. | |
| 2007/0055679 A1* | 3/2007 | Yoshida | G06F 17/2247 |
| 2007/0101322 A1 | 5/2007 | Muschett | |
| 2007/0115984 A1 | 5/2007 | Kumar et al. | |
| 2007/0124305 A1 | 5/2007 | Smith et al. | |
| 2007/0150556 A1 | 6/2007 | Fukuda et al. | |
| 2007/0234217 A1 | 10/2007 | Miller | |
| 2008/0109472 A1 | 5/2008 | Underwood | |
| 2008/0184102 A1 | 7/2008 | Selig | |
| 2008/0222736 A1* | 9/2008 | Boodaei | G06F 21/128 726/27 |
| 2008/0301643 A1 | 12/2008 | Appleton et al. | |
| 2009/0094614 A1* | 4/2009 | Klementiev | G06F 11/3688 719/310 |
| 2009/0228805 A1 | 9/2009 | Ruehle | |
| 2009/0249216 A1 | 10/2009 | Charka et al. | |
| 2014/0157112 A1 | 6/2014 | Miller | |
| 2016/0371235 A9 | 12/2016 | Miller | |

OTHER PUBLICATIONS

"Browser Compatibility Check for Internet Explorer Versions from 5.5 to 8", Retrieved at <<http://my-debugbar.com/wiki/IETester/HomePage>>, Copyright 2001-2009, pp. 2.

"Check Browser Compatibility, Cross Platform Browser Test", Retrieved at <<http://browershots.org/>>, Jun. 9, 2005, p. 1.

"Conference Program & Expo Guide", Vendor Technical Presentation, Website Validation Technology (VT19), the 12th International Software Quality Week 1999, San Jose, CA, May 24-28, 1999, 2 pgs.

"Conference Tutorials Expo Sponsors", conference information and Website Validation Technology (VT19), the 12th International Software Quality Week 1999, San Jose, CA, May 24-28, 1999, 4 pgs.

"Document Object Model (DOM) Level 1 Specification Version 1.0" W3C, Oct. 1, 1998, pp. 1-169.

"E-Commerce Reliability and Web Site Testing," sides, presented at the Third International Software Quality Week Europe 1999, Brussels, Belgium, Nov. 1-5, 1999, 14 pages.

"Expression Web SuperPreview", Retrieved at <<http://expression.mircosoft.com/en-us/dd565874(printer).aspx>>, no later than Oct. 13, 2009, pp. 2.

"Expression Web SuperPreview", Retrieved at <<http://visitmix.com/News/Expression-Web-SuperPreview>>, Mar. 18, 2009, pp. 3.

"Firebug (Firefox extension)", Retrieved at <<http://enwikipedia.org.wiki/Firebug_(Firefox_extension)>>, Jul. 18, 2009, pp. 1.

"First Browser Based Web Testing Tool Provides Accuracy Breakthrough," Press Release, eValid, Inc., Sep. 6, 2000.

"Functional/Regression Test Tools", Retrieved at <<http://www.qcforum.org/viewtopic.php?id=14>>, Apr. 4, 2008, pp. 8.

"IBM Rational Functional Tester Proxy SDK Reference", Retrieved at <<htpp://publib.boulder.ibm.com/infocenter/rfthelp/v7r0m0/index.jsp?topic=/com.rational.test.ft.proxy.api.help/ProxyApiReference/overview-summary.html>>, Oct. 9, 2009, pp. 5.

"Internet Explorer Developer Toolbar", Retrieved at <<http://en.wikipedia.org/wiki/Internet_Explorer_developer_Toolbar>>, Jun. 1, 2009, pp. 2.

(56) References Cited

OTHER PUBLICATIONS

"Netrenderer", Retrieved at <<http://ipinfo.info/netrenderer/index.php?>>, Oct. 12, 2007, p. 1.
"Products.new", Software Magazine, vol. 19, Issue 2, p. 67, plus front page of magazine and one page advertisement, Sep. 1999.
Ready, Set, eValid, advertisement, Appliction Development Trends, www.adtmag.com, 2 pages, Nov. 2000.
"Record and Playback for IBM Rational Functional Tester 7.0 does not Work on HTML Browser Menu Options", Retrieved at <<http://www-01.ibm.com/support/docview.wss?uid=swg2125183>> Oct. 9, 2009, p. 1.
"Selenium-RC", Retrieved at <<http://seleniumhq.org/docs/05_selenium_rc.html>>, Oct. 13, 2009, pp. 21.
"Software Research Announces CAPBAK/Web to Test Reliability of Web Sites", Press Release Software Research Inc., 4 pages, Jul. 26, 1999.
SR Announces New Testing Application Suite for the Web: STW/Web:, Press Release Software Research Inc., 2 pages, Feb. 12, 1996.
"Testing Techniques Newsletter (TTN)," On-line edition, Jul. 1999, pp. 1-18.
"Website Validation Technology", conference slides, the 12th International Software Quality Week 1999, San Jose, CA, May 24-28, 1999, 20 pgs.
"Automated Testing with TestComplete 8", Automated Testing Tools, http://smartbear.com/products/qa=tools/automated-testing. downloaded Nov. 20, 2011, 3 pages.
"DejaClick", DejaClick—Wikipedia, the free encyclopedia, http://en.wikipedia.org/wiki/Dejaclick, downloaded Nov. 20, 2011, 2 pages.
"Interface WebDriver", WebDriver, http://selenium.googlecode.com/svn/truck/docs/api/java/org/openqa.selenium/WebDriver.html, downloaded Nov. 20, 2011, 7 pages.
"Internet Explorer", Wikipedia, the free encyclopedia, http://en.wikipedia.org/wiki/Internet_Explorer, downloaded Dec. 9, 2011, 26 pages.
"Keynote Kite", Learn about—Keynote Internet Testing Environment, http://kite.keynote.com/how-it-works.php, downloaded Nov. 20, 2011, 3 pages.
"Keynote Kite", Test Website|Testing Web Applications|Application Performance Testing—KITE, http://kite.keynote.com, downloaded Nov. 20, 2011, 1 page.
"Keynote Systems Introduces AJAX-Based Testing Tool for Rich Web 2.0 Sites", http://in.sy-con.com/node/451642/print, downloaded Nov. 20, 2011, 2 pages.
"Keynote systems", Keynote systems—Wikipedia, the free encyclopedia, http://en.wikipedia.org/wiki/Keynote_systems, downloaded Nov. 20, 2011, 4 pages.
"Open Source at Google", Introducing WebDriver—Google Open Source Blog, http://google-opensource.blogspot.com/2009/05/introducing-webdriver.html, May 8, 2009, 3 pages.
"Printable Watir Tutorial", Printable Tutorial—Watir—OpenQA Wiki, http://wiki.openqa.org/display/WTR/Printable+Tutorial, downloaded Nov. 20, 2011, 49 pages.
"Project Home", Project Home—Watir—OpenQA Wiki, http://wiki.openqa.org/display/WTR/Project+Home, downloaded Nov. 20, 2011, 2 pages.
"Selenium (software)" Selenium (software), Wikipedia, the free encyclopedia, http://en.wikipedia.org.wiki.Selenium_(software), downloaded Nov. 20, 2011, 3 pages.
"Selenium Documentation", http://seleniumhq.org/docs, downloaded Nov. 20, 2011, 3 pages.
"Selenium Users", Selenium Users|Google Groups, http://groups.google.com/group/selenium-users/about, downloaded Nov. 20, 2011, 2 pages.
"Selenium-IDE", Selenium-IDE—Selenium Documentation, http://seleniumhq.org.docs.02_selenium_ide.html#the-watfor-commands-in-ajax-applications, downloaded Nov. 20, 2011, 46 pages.
"SWExplorerAutomation (SWEA)", Webius—Webius Internet Explorer Automation, http://webiussoft.com, downloaded Nov. 20, 2011, 2 pages.
"Test Automation for Web Applications", Introduction—Selenium Documentation, http://seleiumhq.org/docs/01_introducing_selenium.html#brief-history_of . . . , downloaded Nov. 20, 2011, 8 pages.
"TestComplete", TestComplete—Wikipedia, the free encyclopedia, http://en.wikipedia.org.wiki.Testcomplete, downloaded Nov. 20, 2011, 4 pages.
"Waitr General—Discussion", Discussions—Watir General|Google Group, http://groups.google.com/group/watir-general/topics?tsc=2, downloaded Nov. 20, 2011, 3 pages.
"Watir.com", Watir.com|Web Application Testing in Ruby, http://watir.com/, downloaded Nov. 20, 2011, 7 pages.
"Watir", Watir—Wikipedia, the free encyclopedia, http://en.wikipedia.org.wiki/Watir, downloaded Nov. 20, 2011, 3 pages.
"Webdriver", Webdriver|Google Groups, https://groups.google.com/group/webdriver/about, downloaded Nov. 20, 2011, 2 pages.
"What is DejaClick?", DejaClick™ by AlertSite®, http://www.dejaclick.com/, downloaded Nov. 20, 2011, 2 pages.
Advisory Action for U.S. Appl. No. 10/041,768 dated Sep. 9, 2005.
Ajax (programming) Wikipedia Downloaded Aug. 11, 2011, pp. 1-4.
Author Unknown, "Successful Deployment of Ajax and OpenAjax", Originally published at www.openajaz.org, Archived Feb. 26, 2008 at <http://web.archive.org/web/20080226021111/http://www.openajax.org/whitepapers/Successful%20Deployment%20of%20Ajax%20and%OpenAjax.php>.
Cugini et al., "Design of a File Format for Logging Website Interaction", Retrieved at <<http://zing.ncsl.nist.gov/cugini/webmet/flud.design-paper.html>>, Apr. 2001, pp. 9.
Document Object Model, Wikipedia, downloaded Jul. 7, 2011, pp. 1-6.
Eaton, et al., "Position Paper: Improving Browsing Environment Compliance Evaluations for Websites", Retrieved at <<http://conferenze.dei.polimi.it/wq04/final/paper04.pdf>>, Oct. 9, 2009, pp. 6.
Edward Miller, "WebSite Testing," White paper, 2000 (printed on Oct. 31, 2000).
Edward Miller, "WebSite Testing," White paper, presented at the Third International Software Quality Week Europe 1999, Brussels, Belgium, Nov. 1-5, 1999.
EValid User Manual, v7, Software Research, Inc., May 21, 2007, 677 pgs.
EValid User Manual, v8, Software Research, Inc., Jan. 28, 2008, 894 pgs.
EValid, "E-Commerce Reliability and Web Site Testing," (with attached video graphics), presented at the Third International Software Quality Week Europe 1999, Brussels, Belgium, Nov. 1-5, 1999.
EValid, "Subscription Test TeleServices, Custom Website Testing and Validation, Web Site Quality Consulting," presented at the Third International Software Quality Week Europe 1999, Brussels, Belgium, Nov. 1-5, 1999.
Final Office Action for U.S. Appl. No. 12/247,753, dated Jul. 11, 2012.
Final Office Action for U.S. Appl. No. 12/247,753, dated May 16, 2012.
Finlay, "Web Testing Tools Break Out of Windows GUI", SD Times, www.sdtimes.com, 3 pages, Oct. 15, 2000.
Fruhlinder, Joshua, "Cross-Brower Web Application Testing Made Easy", Retrieved at <<http://www.ibm.com/developerworks/web/library/wa-crossbrowser/>>, Dec. 18, 2007, pp. 11.
JavaScript, Wikipedia, Downloaded Aug. 14, 2011 pp. 1-20.
Marchetto, A.: Tonella, P.: Ricca, F.;, "State-Based Testing of Ajax Web Applications," Software Testing, Verification, and Validatin, 2008 1st International Conference on, vol., No., pp. 121-130, Apr. 9-11, 2008 doi: 10.1109/ICST.2008.22 URL:http://ieeexplore.ieee.org/stamp/stamp.jsp?tp=&arnumber=4539539&isnumber=4539517.
Notice of Allowance for U.S. Appl. No. 10/041,768 dated Feb. 8, 2007.
Notice of Allowance for U.S. Appl. No. 11/758,624 dated Mar. 23, 2010.
Notice of Allowance for U.S. Appl. No. 12/247,753, dated Aug. 26, 2011.

(56) References Cited

OTHER PUBLICATIONS

Notice of Allowance for U.S. Appl. No. 12/247,753, dated Dec. 12, 2011.
Notice of Allowance for U.S. Appl. No. 12/795,553, dated Sep. 27, 2012.
Office Action for U.S. Appl. No. 10/041,768 dated Aug. 23, 2006.
Office Action for U.S. Appl. No. 10/041,768 dated Dec. 28, 2005.
Office Action for U.S. Appl. No. 10/041,768 dated Feb. 14, 2005.
Office Action for U.S. Appl. No. 10/041,768 dated Jul. 2, 2004.
Office Action for U.S. Appl. No. 10/041,768 dated May 13, 2005.
Office Action for U.S. Appl. No. 10/041,768 dated Jan. 16, 2007.
Office Action for U.S. Appl. No. 11/758,624 dated Sep. 17, 2009.
Office Action for U.S. Appl. No. 12/247,753, dated Mar. 3, 2011.
Office Action for U.S. Appl. No. 12/247,753, dated Mar. 22, 2012.
Advisory Action for U.S. Appl. No. 12/247,753, dated Aug. 28, 2012.
Office Action for U.S. Appl. No. 12/795,553, dated Mar. 8, 2012.
Product Release Notes, CAPBAK/Web (IE) for Windows NT and Windows 2000, Mar. 21, 2000.
Product Release Notes, CAPBAK/Web (IE) Ver. 1.5, Nov. 24, 1999.
Salzmann, "Java Product News", JavaWorld, www.javaworld.com/javaworld/jw-10-2000/jw-1020-newsbrief.html, 4 pages, Oct. 20, 2000.
Software Tech News, "WebSite Testing—Software Testing," vol. 3, No. 2, printed from http://dacs.dtic.mil/awareness/newsletters/stn3-2/toc.html on Oct. 31, 2000.
The Third International Software Quality Week Europe 1999: Lessons Learned, Seminar/Conference outline, Brussels, Belgium, Nov. 1-5, 1999.
The Thirteenth International Software & Internet Quality Week, Registration Materials for Seminar/Conference, San Francisco, CA, May 30-Jun. 2, 2000.
U.S. Appl. No. 12/247,753, filed Nov. 18, 2008.
U.S. Appl. No. 12/795,553, filed Jun. 7, 2010.
W3C Document Object Mode, W3C, www.w3.org/dom, Jan. 6, 2009, pp. 1-3.
Xiong et al., "Testing Ajax Applications with Selenium", InfoQ, www.infoq.com/articles/testing-ajax-selenium>, Sep. 25, 2006, 8 pages.
Office Action for U.S. Appl. No. 12/247,753, dated Oct. 26, 2012.
U.S. Appl. No. 13/672,599, filed Nov. 8, 2012.
U.S. Appl. No. 13/764,635, filed Feb. 11, 2013.
U.S. Appl. No. 13/764,628, filed Feb. 11, 2013.
Notice of Allowance of U.S. Appl. No. 13/764,628 dated May 15, 2013.
Office Action for U.S. Appl. No. 13/764,635, dated Jun. 6, 2013.
Strange, "The $60 Web-Test Toolbox", Better Software, Oct. 2006, 3 pgs.
Notice of Allowance for U.S. Appl. No. 13/672,599, dated Oct. 21, 2013.
Final Office Action for U.S. Appl. No. 13/764,635, dated Dec. 6, 2013.
Notice of Allowance for U.S. Appl. No. 13/764,635, dated Jan. 28, 2014.
Office Action for U.S. Appl. No. 13/922,579, dated Mar. 14, 2014.
Office Action for U.S. Appl. No. 12/818,038, dated Sep. 24, 2013.
Advisory Action for U.S. Appl. No. 13/922,579, dated Jan. 8, 2015.
Office Action for U.S. Appl. No. 14/211,305, dated Mar. 25, 2015.
"IBM Rational Functional Tester Proxy SDK Reference", Retrieved at <<htpp://publib.boulder.ibm.com/infocenter/rfthelp/v7r0m0/index.jsp?topic=/com.rational.test.ft.proxy.api.help/ProxyApiReference/overview-summary.html>>, Oct. 9, 2009, pp. 5.
Ready, Set, eValid, advertisement, Application Development Trends, www.adtmag.com, 2 pages, Nov. 2000.
Final Office Action for U.S. Appl. No. 14/211,305, dated Jul. 20, 2016.
Office Action for U.S. Appl. No. 14/211,305, dated Nov. 16, 2016.
Office Action for U.S. Appl. No. 14/098,372, dated Nov. 29, 2016.
Office Action for U.S. Appl. No. 14/211,305, dated Mar. 9, 2017.
Final Office Action for U.S. Appl. No. 14/098,372, dated Jun. 2, 2017.
Advisory Action for U.S. Appl. No. 14/211,305, dated Jun. 20, 2017.
Office Action for U.S. Appl. No. 14/211,305, dated Sep. 6, 2017.
Advisory Action for U.S. Appl. No. 14/098,372, dated Dec. 5, 2013.
Office Action for U.S. Appl. No. 14/098,372, dated Jan. 11, 2018.
Final Office Action for U.S. Appl. No. 14/211,305, dated Apr. 23, 2018.
Final Office Action for U.S. Appl. No. 14/098,372, dated Dec. 10, 2018.
J. Moore, *Using Selenium's waitForValue, waitForCondition for Ajax Tests*, Agile Reality, Nov. 2005 Edition, Nov. 22, 2005.
Huggins et al., An Introduction to Testing Web Applications with twill and Selenium, Jun. 2007 [https://www.oreilly.com/library/view/an-introduction-to/9780596527808/ (Book)].
Ji-Tzay Yang, et. al., *An Object-Oriented Architecture Supporting Web Application Testing*, IEEE, CompSAC Conference, Oct. 29, 1999 [https://ieeexplore.ieee.org/do cument/812689].
Automatisert testing av dynamisk HTML (Norwegian University of Science and Technology), Jun. 16, 2006 Loe et al. [http://citeseerx.ist.psu.edu/viewdoc/download?doi=10.1.1.368.2479&rep=rep1&type=pdf (English).].
Test-Driven Development of Ajax enabled web applications on the Java platform (Agder University College), May 2006 [https: //uia.brage.unit.no/uia-xmlui/handle/11250/137164]. Andersen et al.
"Using Rational Robot," Product Manual, Part No. 800-011590-000, Rational Software Corporation, Dec. 1998.

\* cited by examiner

DRIVING A WEB BROWSER FOR TESTING WEB PAGES USING A DOCUMENT OBJECT MODEL

CROSS-REFERENCE TO OTHER APPLICATIONS

This application is a continuation of U.S. patent application Ser. No. 13/922,579, filed Jun. 20, 2013, and entitled "METHOD AND SYSTEM FOR TESTING WEBSITES" (now U.S. Pat. No. 8,984,491), which is hereby incorporated by reference herein, which is a continuation of U.S. patent application Ser. No. 13/764,628, filed Feb. 11, 2013, and entitled "METHOD AND SYSTEM FOR TESTING WEBSITES" (now U.S. Pat. No. 8,495,585), which is hereby incorporated by reference herein, which is a continuation of U.S. patent application Ser. No. 12/247,753, filed Oct. 8, 2008, and entitled "METHOD AND SYSTEM FOR TESTING WEBSITES" (now U.S. Pat. No. 8,392,890), which is hereby incorporated by reference herein, and which in turn claims priority benefit of U.S. Provisional Patent Application No. 60/980,068, filed Oct. 15, 2007, and entitled "METHOD SYSTEM AND SYSTEM FOR TESTING WEBSITES," which is hereby incorporated by reference herein.

This application also references (i) U.S. Pat. No. 7,231,606 which is hereby incorporated by reference herein; and (ii) U.S. patent application Ser. No. 11/758,624, filed Jun. 5, 2007, and entitled "METHOD SYSTEM AND SYSTEM FOR TESTING WEBSITES", now U.S. Pat. No. 7,757,175, which is hereby incorporated by reference herein.

COPYRIGHT NOTICE

A portion of the disclosure of this patent document contains material that is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever.

BACKGROUND OF THE INVENTION

Field of the Invention

The present invention relates to software testing and, more particularly, to automated analysis and testing of websites.

Description of the Related Art

Websites are complex collections of information intended to be viewed and used and interacted with by sending information from a WebSite server over the Internet to users who work with this information from an internet browser (client program) that typically runs on a computing device, such as a personal computer (PC). A common browser is the Internet Explorer (IE) browser that runs on Microsoft Windows. However, the invention can also equally apply to non-IE browsers.

Testing and analysis of Web Applications and WebSites is needed for various reasons:
1. To confirm content and proper operation and proper content (functional testing and validation).
2. To determine delivered performance of a web application server (timing and tuning).
3. To analyze capacity of the WebSite server by imposing realistic loads (server loading).
4. To identify properties and characteristics of collections of pages (site analysis).

There are several alternative methods that can be used to obtain information about how a WebSite behaves. These alternative methods are as follows: (1) Intercept of the Windows event loop, which means that the program has to process every keyboard activity and/or mouse activity at the primitive level of where it interacts with the operating system (OS). (2) Intercept the HTTP protocol sequence by building a wrapper or a proxy around a browser instances, thereby extracting the sequence of interactions between the browser and the WebSite server. (3) Capture information within the browser by building a free-standing browser with test capabilities.

Thus there is a need for improved approaches to testing websites.

SUMMARY

The invention generally relates to testing of web browser enabled applications. In one embodiment, a browser application can allow a user to perform test and analysis processes on a candidate web browser enabled application. The test enabled browser can use special functions and facilities that are built into the test enabled browser. One implementation of the invention pertains to functional testing, and another implementation of the invention pertains to pertains to site analysis.

The invention can be implemented in numerous ways, including as a method, system, device, or apparatus (including graphical user interface and computer readable medium). Several embodiments of the invention are discussed below. These embodiments can be used separately or in any combination.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention generally relates to testing of web browser enabled applications. In one embodiment, a browser application can allow a user to perform test and analysis processes on a candidate web browser enabled application. The test enabled browser can use special functions and facilities that are built into the test enabled browser. One implementation of the invention pertains to functional testing, and another implementation of the invention pertains to pertains to site analysis.

A test enabled web browser can provide many advantages in terms of control of the test process, ability to measure at a fine level of detail, to manipulate and validate the contents of WebSite pages as they are rendered, and/or to extract linking and other information from WebSite pages in their fully rendered form.

A system, method or apparatus (including graphical user interface and computer readable medium) is disclosed for testing and analyzing WebSites via a test enabled web browser. In one embodiment, a user can control the test enabled web browser via a set of pull-down menus, thereby choosing between alternative testing and analysis functional capabilities. In one embodiment, the invention is thus a test enabled web browser that has all of the functionality of the parallel IE technology and which has all required test functionality built in and easily accessible by a WebSite analyst.

In the WebSite analysis process the test enabled web browser can act as a constrained search engine which examines pages in the candidate Website according to a set of inclusionary and exclusionary rules. During the automated browsing each browsed pages is analyzed for a range of quality attributes such as performance, content, structure and organization. Results of these analyses can be made available in a variety of ways for use by analysts.

The general result of systematic use of the invention on WebSites can yield improved content quality, demonstrated WebSite server behavior from an end-user perspective, and better serviceability for e-business enterprises.

According to one embodiment, the techniques disclosed herein can use techniques described in detail in U.S. Pat. No. 7,231,606, entitled "Method and System for Testing Websites," which is hereby incorporated herein by reference. Terminology, concepts, organization, and technical aspects of that Patent are used herein.

A. Browser Operation

Figure 1:
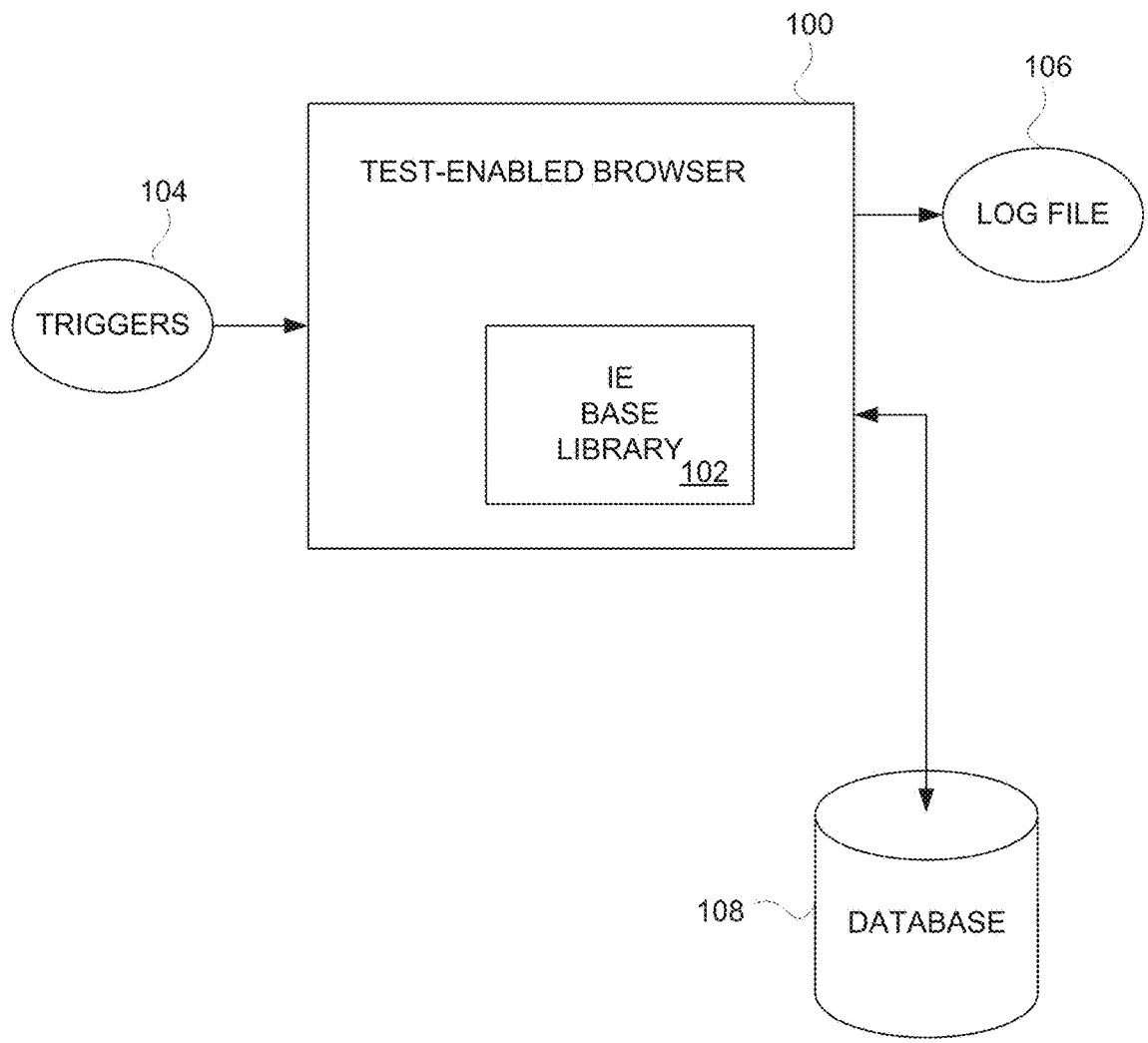
FIG. 1 is a block diagram of a test-enabled browser according to one embodiment.

FIG. 1 is a block diagram of a test-enabled browser 100 according to one embodiment. The test-enabled browser 100 is designed to provide automated analysis and testing of websites. The test-enabled browser 100 operates on a computing device (not shown). The test-enabled browser 100 makes use of Internet Explorer (IE) base library 102. In this regard, the test-enabled browser 100, in effect, emulates a browser but further provides the capability to perform the automated analysis and testing of websites. The test-enabled browser 100 receives triggers 104 from an operating system. These triggers (or event triggers) are, for example, a mouse click, a mouse drag, a return, text entry, etc. Based on these triggers 104, the test-enabled browser 100 operates to perform the automated analysis and testing of websites. In doing so, the test-enabled browser 100 can produce a log file 106 or can interact with a database of information 108.

B. Browser Signaling

Figure 2:
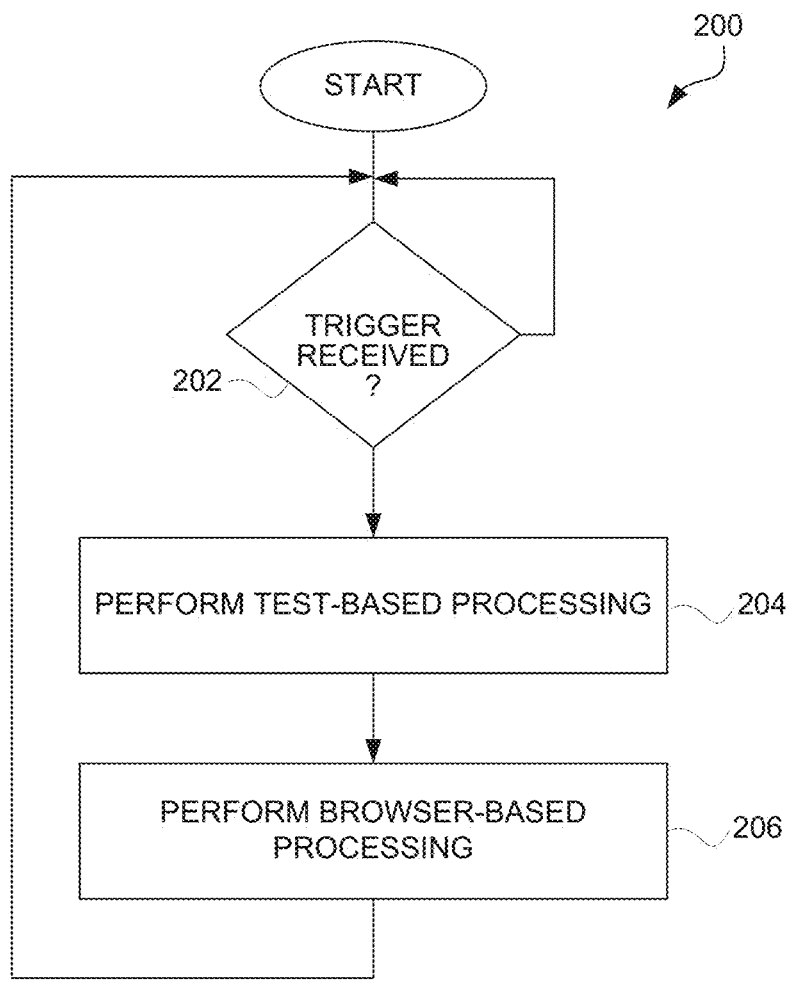
FIG. 2 is a flow diagram of test-enabled browser processing according to one embodiment.

FIG. 2 is a flow diagram of test-enabled browser processing 200 according to one embodiment. The test-enabled browsing processing 200 is, for example, suitable for performance by the test-enabled browser 100 illustrated in FIG. 1.

A test-enabled browser processing 200 initially begins with a decision 202 that determines whether a trigger has been received. When the decision 202 determines that a trigger for the test-enabled browser has not yet been received, then the test-enabled browser processing 200 awaits such a trigger. Once the decision 202 determines that a trigger has been received for the test-enabled browser, test-based processing is performed 204. Here, the test-based processing is the processing needed to carry out the particular type of testing being performed on a determined website. Following the performance of the test-based processing, browser-based processing is performed 206. Here, the browser-based processing is processing typically performed by a browser application (network browser). Here, the browser-based processing, in one implementation, can be provided using the code resources stored for example in the IE-based functional library 102 illustrated in FIG. 1. Following the operation 206, the test-enabled browser processing 200 returns to repeat the decision 202 and subsequent blocks so that subsequently received triggers can be similarly processed.

C. Browser Internal Operation

Figure 3:
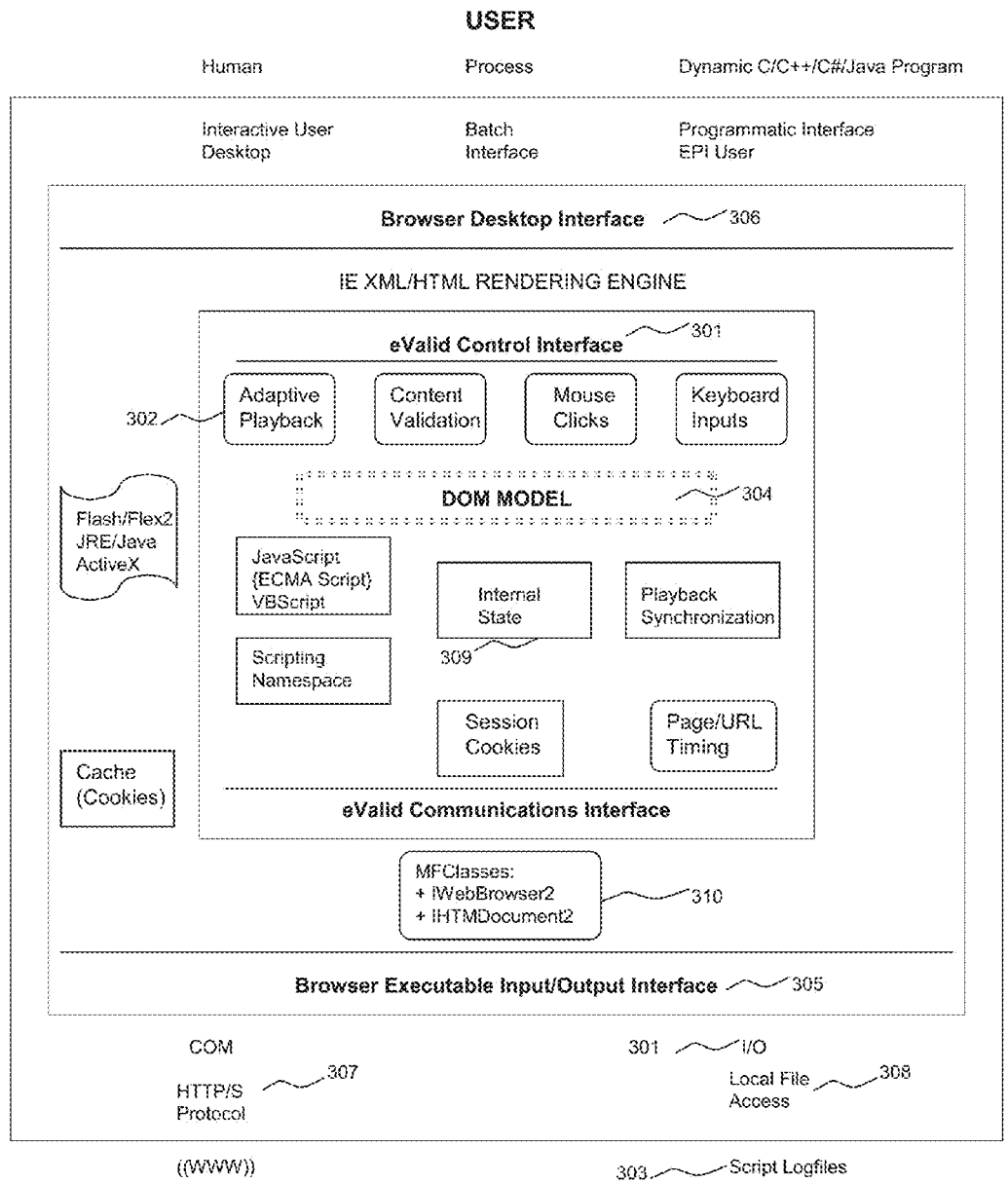
FIG. 3 is a block diagram of browser interfaces according to one embodiment.

FIG. 3 is a block diagram of browser interfaces according to one embodiment of the invention. As FIG. 3 shows, the internal structure of a typical browser involves a variety of standard components that interact to produce the browsing experience.

In the case of the subject invention, one of which embodiments is a test enabled browser referred to as a product called "eValid", these components can operate in unison to provide a realistic browsing experience, but also to provide such auxiliary functions as:

1. Making a recording of user actions as sensed internally at 300 and 301 to produce a test script;
2. Acting to dynamically modify candidate recording actions based on actual actions taken by the browser based on its interaction with the web application under test, called Adaptive Playback 302;
3. Playback of recorded scripts 303 based on the content of the recorded script;
4. Modification of playback based on actual behavior of web application under test as it interacts with the test enabled browser; and
5. Sensing and modification of the underlying Document Object Model (DOM) at 304 for special purposes of the test process as commanded by the user (see below).

In addition to internal page-specific capabilities, the invention also includes

1. An external interface 305 to allow the collection of data about the test,
2. A browser desktop interface 306 to permit the browser to communication to other processes in the computer,
3. Access 307 to the HTTP/S protocol that is used to communicate to/from the web application server,
4. Local file access 308 to keep records of the entire test activity.

The internal state 309 of the browser is maintained because the browser uses standard browsing components, in the form of DLLs 310 that are available with any browser.

D. Browser DOM Structure

The relationship between the browsed page and its internal Document Object Model (DOM) is critical to understanding how the invention achieves its effects. In a web page there is a collection of DOM elements that describe each part of the page, some visible to the user and some meaningful only to the browser. DOM elements are available in the browser after the web page is rendered. Individual element are numbered from the top of the page (element zero) to the bottom of the page with integers. Each DOM element may have a collection of associated attributes (sometimes also called properties) which are dependent on the content of the page.

Figure 4:
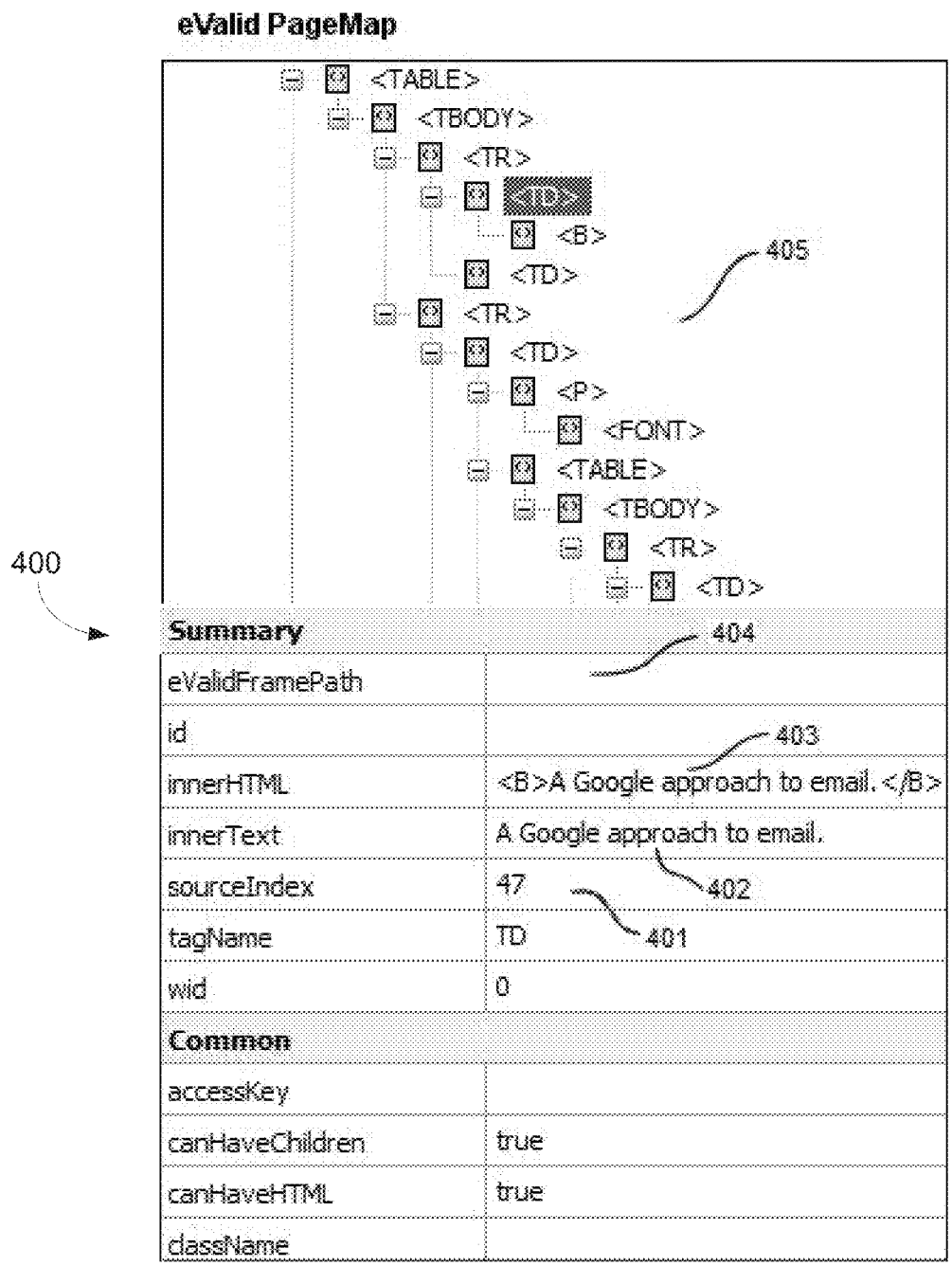
FIG. 4 is a section of representative DOM internal content according to one embodiment.

FIG. 4 is a section of representative DOM internal content according to one embodiment. In FIG. 4, item 400 shows an index value of an element, reflected here in the representative implementation as the value of the "sourceIndex" attribute "51". The HTML (HyperText Markup Language) tag names are identified with their own naturally occurring names. For example, 401 shows the value of element 51's attribute "tagName" is "TD", and for in 402 the same element has an attributed named "innerText" with the value "A Google approach to email." As shown in the diagram the actual text appearing in the web page rendering is given at 403 as "<B>A Google approach to email</B>. The position of this particular element (element number 51) in the tree of other elements is shown in the tree structure 405.

The embodiment of the invention includes the ability to read, scan, analyze, modify, adjust, and change the particular values of any attribute of any element in the current DOM. This capability is required for such capabilities as test playback synchronization on DOM values, on validation of particular attributes of page elements, and/or on user-prompted modification of DOM elements for specific purposes. These are typical uses of the ability within the invention to read, analyze, and modify the DOM, but no limit to the use of this capability is implied.

E. Structure of Representative Implementation

Figure 5:
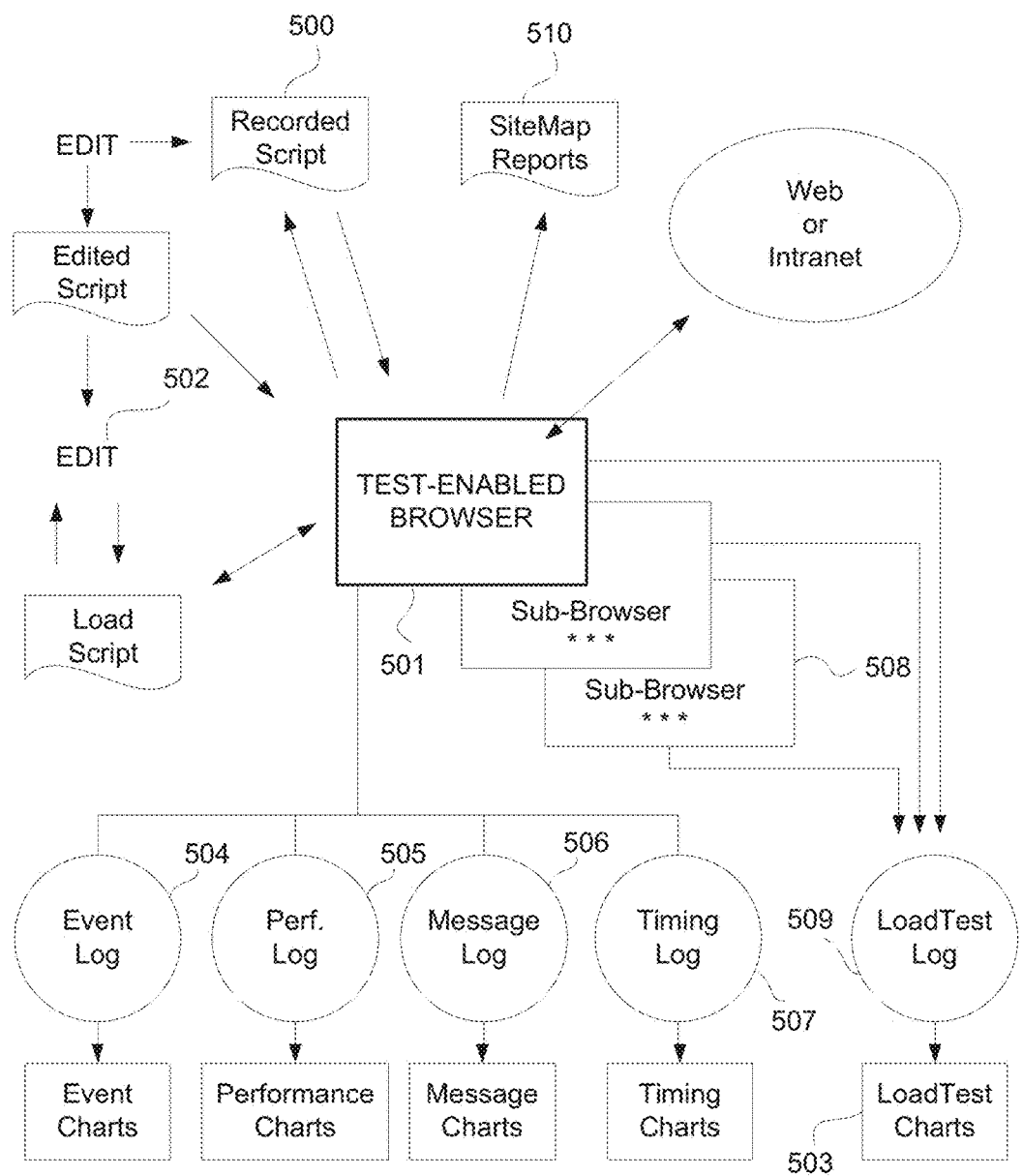
FIG. 5 is a block diagram of a website test system according to one embodiment.

FIG. 5 is a block diagram of a website test system according to one embodiment. One or more embodiments of the invention appear in a test enabled browser product, whose structure and organization are shown in FIG. 5. This diagram identifies the relationships between the externally viewed product features:

1. Recorded scripts 500 are created by and read and executed (played back) but the test enabled browser 501, which can be edited 502 and converted into load test logs 503.
2. Playback operation involves the creation of various event logs 504 and their subsets, such as the Performance Log 505, the Message Log 506, and the Timing log 507.
3. When multiple copies 508 of the test enabled browser are running then a special 509 LoadTest log is used to capture details of individual playbacks.
4. Scans of websites using the spider/search function create reports 510 the relate to whole-site analysis.

F. Internal Embodiments Based on DOM Operations

Additional applications of the invention's ability to analyze the DOM structure of a browser page include the following. For example, one or more embodiments can provide Detailed Page Analysis For Properties.

1. Client Perspective

One aspect of test enabled web browsers is that they can scan "over the wire" and "from the client perspective"—a significant technical advantage. Access to the DOM for analytic purposes is assured because the test enabled web browser uses standard browser components, among which is an interface to the DOM for each web page that is browsed. A characteristic of the implementation of this feature is that the resulting analysis and/or spidering of the web page is dependent on how the page actually exists at the time it is served to the test enabled web browser, and does not include or exclude any details or effects that are pertinent to the structure, organization, layout, and content of the web page. The operation of the search and scan activity creates a database of information about individual pages and their interactions and dependencies, such that the database can be used for later offline analysis.

2. Link Extraction

The test-enabled web browser can see in the pages in complete detail, extract anything, and use that information in website comparison activities. The analysis of properties is assured because of the architecture of the test enabled web browser. All of this information is available because the test enabled web browser uses standard browser components, among which is an interface to the DOM for each page that is browsed. A characteristic of the implementation of this feature is that that the information that is collected and stored in a database is available using standard browsing components and standard DOM models, such as are typically employed in available general purpose web browsers of several kinds and types.

3. DOM Spidering

More selective inclusion and exclusion of links in the work-to-be-done list/tree. This is key to a successful and useful scan, being able to decide based on page properties, mainly the URL but also on other internal criteria, whether to add it to the work list. If you did not do this you would have to scan everything you find, and you may not want that. User control is important. The criteria for inclusion and exclusion are inclusive of any property of the page, its component elements, its DOM properties, and its links to other pages. All of this information is available because, in one embodiment, the test enabled web browser uses standard browser components, among which is an interface to the DOM for each page that is browsed. A characteristic of the implementation of this is that the origin of the search process described above can be determined by the user, so that the search can be made of one or more websites or sub-websites, as specified by a starting or "root" URL and as constrained according to the claimed limits and constraints, so that data can be collected on full websites or sub-websites according to the wishes and expectations of the user.

4. Cross-Page Dependency Lists

Page to page dependency capture based on the dynamic links within the current page (web page) can be performed. The page to page dependency tree can be kept internally in a linked list of parent-child dependencies. Those pages at/below an established root can be considered a subwebsite.

A characteristic of the implementation of this feature is that the interface between the analysis function and the database function is one that can use standard database interface components, such that alternative database systems can be used to contain the information that is captured without any loss of information or content.

Below various embodiments of a test enabled browser are discussed. In particular, embodiments of the invention can provide, support or use one or more of: AJAX Synchronization; Page Face Motion Playback; Page Element/Event Stimulation; Page Element Validation; Page Get/Put Operation; Page Navigation Header Manipulation; DOM-Based Adaptive Playback; Programming Language Interface; URL Sequence Capture; and/or Page Analysis and Structure Extraction.

A. AJAX Synchronization

AJAX (Asynchronous JavaScript and XML), is a technology for rich-client browser-based applications. This approach is sweeping the technical community. Based on advanced use of JavaScript, AJAX represents competition to the less flexible capabilities available in such products as Adobe/FLEX.

For functional testing the challenge imposed by AJAX is to synchronize playback of test scripts in an environment which is inherently asynchronous. Advanced test script playback synchronization, virtually a necessity for AJAX implementations, can be implemented in the subject invention with DOM-based methods. Locking in this capability adds capability to synchronize inherently asynchronous processes to reproduce user input.

A characteristic of the implementation of this feature is that the test enabled web browser has multi-threaded access to the DOM of the current page, or has the capability of simultaneous access of the DOM in concert with other browsing activities, so that one or more synchronization activities or processes can proceed in parallel with other asynchronous activities that may be operating within the browser.

1. Representative Implementation

This command can allow for synchronization of playback based on the appearance of a particular value for a specified DOM element on a page. The command can also support Adaptive Playback to provide for intelligent behavior even when the page changes slightly.

The following commands are indicative of the kinds of actions that can be included in the invention, but they are not exclusive. The examples below are present in the representative implementation but similar commands or variants of them would be present in other implementations. The sense and behavior of the commands is independent of the implementation.

| COMMAND SYNTAX | EXPLANATION |
| --- | --- |
| SyncOnSelectedObjProperty wid idx DOM_name DOM_value "frame_path" | Synchronizes playback based on specified DOM name and value combination. |
| SyncOnSelectedObjProperty wid idx "id_value" DOM_name DOM_value "frame_path" | Synchronizes playback based on specified DOM name and value on an element with specified ID tag in the specified element. |
| SyncOnSelectedObjProperty wid idx "id_name" "id_value" DOM_name DOM_value "frame_path" | Synchronizes playback based on specified DOM name and value on an element with specified ID tag and value in the specified element. |
| SyncNotOnSelectedObjProperty wid idx DOM_name DOM_value "frame_path" | Synchronizes when a specified DOM name and value are NOT present in the specified element. |
| SyncNotOnSelectedObjProperty wid idx "id_value" DOM_name DOM_value "frame_path" | Synchronizes when a specified DOM name and value are NOT present in the specified element which must have the specified ID tag name. |
| SyncNotOnSelectedObjProperty wid idx "id_name" "id_value" DOM_name DOM_value "frame_path" | Synchronizes when a specified DOM name and value are NOT present in the specified element which must have the specified ID tag name and value. |
| SyncOnElementProperty wid "name" "Value" "frame_path" | Waits for a named element property to have a specified value. Playback continues when any element's specified property has the required value. This applies to any property of any element anywhere in the DOM. |
| SyncNotOnElementProperty wid "name" "Value" "frame_path" | Waits for a named element property and value to NOT be found -- anywhere in the DOM. Playback continues the first time that any element has the required property not equal to the required value. |

2. Suggested Usages

Here is a typical instance of use of this command to synchronize on the value of the DOM object feature in window 0 at DOM index 254 named Processing_State to take on the value DONE:

SyncOnSelectedObjProperty 0 254 Processing_State DONE ""

Pauses playback until ID Processing_State=DONE.

SyncOnSelectedObjProperty 0 254 IDvalue Processing_State DONE ""

Pauses playback until ID Processing_State=DONE, and then confirms there is a element named IDname.

SyncOnSelectedObjProperty 0 254 IDname IDvalue Processing_State DONE ""

Pauses playback until ID Processing_State=DONE, and then also confirms that the property named IDname=IDvalue.

SyncOnSelectedObjPropertyNOT 0 254 Processing_State DONE ""

Continues playback if ID Processing_State=DONE is not true.

SyncOnSelectedObjPropertyNOT 0 254 IDname Processing_State DONE ""

Continues playback if ID Processing_State=DONE is not true AND that element does NOT have a property named IDname.

SyncOnSelectedObjPropertyNOT 0 254 IDname IDvalue Processing_State DONE ""

Continues playback if ID Processing_State=DONE is not true AND that element does NOT have a property named IDname=IDvalue (but any other value causes the playback to pause).

SyncOnElementProperty 0 Processing_State DONE "" Waits until SOME element anywhere in the DOM has a property name Processing_State with value=DONE.

SyncNotOnElementProperty 0 Processing_State DONE "" Waits until NO element anywhere in the DOM has a property name Processing_State with value=DONE.

3. Intended Application

The main intended purpose of this command is to provide auxiliary playback synchronization for pages that do not completely adhere to standard synchronization methods that are provided by a test enabled browser. Among many types of implementation, AJAX-built pages tend to have this characteristic.

To apply the command successfully you may need to study the internal structure of the page that you are trying to synchronize on, find the ID of the element whose value you are searching to match, and then adjust the test enabled browser's behavior using the SyncOnDOM command to wait for that element to take on the required value.

4. Escapement Mode Synchronization Method

In practice it probably may be required to operate a chain of these commands in escapement mode, according to one of these patterns:

(+) [(−) (+)]^n (−) [(+) (−)]^n (+) is a wait command waiting for a specified positive event, or a timeout.

(−) is a wait command waiting for a specified negative event, or a timeout.

[ ]^n indicates there may be multiple such instances in a sequence.

B. Page Face Motion Playback

In both AJAX and other web application technologies, there is a need to be able to create scripts that are language and page-detail independent. This need arises because of the use of pages where the content is generated dynamically.

This kind of work is done in the representative implementation with a series of commands that find, move, manipulate, and manage the location of an index value—without having to be concerned with the specifics of what that value is but what it points to, including pointing to things that are a fixed relative location away from a searchable property (property value).

A characteristic of the implementation of this feature is that the test enabled web browser has multi-threaded access to the DOM of the current page, even when the browser is performing other functions in parallel with the operation of the DOM inspection and analysis process. The adaptive playback feature implemented in the representative implementation does not apply to these operations.

1. Representative Implementation

The basic idea of these commands is to make it possible to have playback sequences that move around within the current page and perform certain actions based on what is found there.

These commands give the tester the ability to create test scripts that "navigate" within the current page, possibly in a series of separate steps, to page objects and elements by their visible or DOM name, or even by DOM property name and value, without reference to specific DOM indexes. Because no specific DOM index needs to be identified these tests will be insensitive to inconsequential page changes.

2. Background Information about Web Pages

The context for these commands is based on the organization of the web page in terms of its DOM. Every web page has a DOM that is organized as a collection of elements, each of which has a set of named properties. Individual properties associated with an element on the page may take on a specific value.

Many page elements have a variety of pre-defined properties, which are there and have meaning due to certain standards, but some pages have "custom properties" that can take on values as well. Each DOM element has [by default] a property named "sourceIndex" [note that property names are case sensitive], whose values uniquely number the elements, 0, 1, 2, . . . in order in the DOM tree and in rough order of layout of the page on the screen. The assumption here is that the "searching" being done is based on the delivered pages having this variable structure, but within which there is enough constancy of structure to make the high-level process of exploiting the order of elements feasible.

3. Working Assumptions about these Special Commands

Here are background assumptions that apply this type of command:

There is only one sourceIndex known to the test enabled web browser at any time.

The initial value of the sourceIndex is always set to zero.

The value of the sourceIndex persists between pages.

Commands that use this [internally stored] sourceIndex value always refer to the current page.

The test enabled browser does not modify the sourceIndex except by action of the commands below.

Because motion on the page is from the perspective of the view, a search DOWN toward the bottom of the page means increasing index numbers, whereas a search UP toward the top of the page means decreasing index numbers.

If that's not confusing enough, maybe this will help (or not): if you go all the way UP on a page, you're at sourceIndex 0.

4. A Note about Perspective

The relative orientation of the web page being manipulated is important to understand:

UP: This means "up" on the page as seen by the viewer, i.e. toward the top of the page, and this means decreasing index numbers.

DOWN: This means "down" on the page as seen by the viewer, i.e. toward the bottom of the page, and this means increasing index numbers.

5. Command Descriptions in Representative Implementation

| DOM Element Manipulation/Motion Commands |
|---|
| Working Assumptions About These Commands: |
| There is only one sourceIndex known to eValid at any time.<br>The sourceIndex is always an integer.<br>The initial value of the sourceIndex is always set to zero.<br>The value of the sourceIndex persists between pages.<br>Commands that use this [internally stored] sourceIndex value always refer to the current page.<br>eValid does not modify the sourceIndex except by action of the commands below.<br>Because motion on the page is from the perspective of the view, a search DOWN toward the bottom of the page means increasing index numbers, |

| DOM Element Manipulation/Motion Commands | |
|---|---|
| whereas a search UP toward the top of the page means decreasing index numbers. | |
| COMMAND SYNTAX | EXPLANATION |
| IndexFindElement wid { UP | DOWN } "property_name" ["property_value"] "frame_path" | Starting from the current sourceIndex, this command moves up or down in the DOM element index number sequence until eValid reaches the next element with a property of the specified "property_name" [or until it reaches the next element with a property of the specified "property_name" which has the specified "property_value"], or until eValid reaches the end [or beginning] of the page. The index movement is either UP (decreasing index numbers) initial index is positive or zero. of DOWN (increasing index numbers). When a match if found this command leaves the sourceIndex set to the index of the matching HTML element, if found. If no match is found, the sourceIndex will remain the same. |
| IndexFindElementEx wid { UP | DOWN } "string" [ "string" ] ... "frame_path" | Starting from the current sourceIndex, this command moves up or down in the DOM element index number sequence searching for a Regular Expression match. |
| IndexSet idx | Moves the internally remembered current index to idx. idx = 0 for the first element of the page. idx if you know the specific index you want. An illegal value is corrected to 0 and a message is issued to the Event Log. |
| IndexMove number | Moves forward (positive number) or backward (negative number) the specified number of source index positions, possibly resulting in arriving at the top or bottom of page (but NOT wrapping around). If an IndexMove command attempts to reach beyond the end of the page, or above the beginning of the page, the current index will be set to 0 and a Warning will be issued to the Event Log. |
| IndexFollowLink wid "frame_path" | Similar to the FollowLink script command, the IndexElementClick employs the sourceIndex command issues a click at the current sourceIndex as set by a preceding IndexSet, IndexMove, or IndexFindElement command |
| IndexElementClick wid "frame_path" [NAV] | Similar to the Element Click command, this command issues a click at the current sourceIndex as set by a preceding IndexSet, IndexMove, or IndexFindElement command |
| IndexSubmitClick wid frame_path" | Similar to SubmitClick command, with same parameters and |

-continued

| DOM Element Manipulation/Motion Commands | |
|---|---|
| | meaning. Clicks the button pointed to by the SourceIndex. |
| IndexInputValue wid "type" "extra-1" "extra-2", "frame_path" [NAV] | This is the "Index" version of the InputValue command. Behavior is similar to the InputValue command, with same parameters and meanings. |
| IndexValidateObjProperty wid "property-name" "expected-value", "frame_path" | Validates that on the current sourceIndex the property named takes on the specified value. If the validation fails then an ERROR is logged in the EventLog. |
| IndexSaveObjProperty wid "property-name" "filename", "frame_path" | On the current sourceIndex in the page, saves the the named property named to the specified filename. If the property does not exist, no action is taken. |
| IndexMouseOver wid x y "frame_path" [NAV] | At the current sourceIndex, executes a left-button MouseOver command. The "x y" values specified are offsets within the object supplied by the DOM. |
| IndexMouseDown wid [x y] "frame_path" [NAV] | At the current sourceIndex, executes a left-button MouseDown command. The optional [x y] values specified are offsets within the object that are supplied by the DOM. |
| IndexMouseUp wid [x y] "frame_path" [NAV] | At the current sourceIndex, executes a left-button MouseUp command. The optional [x y] values specified are offsets within the object that are supplied by the DOM. |
| IndexMouseOut wid x y "frame_path" [NAV] | At the current sourceIndex, executes a left-button MouseOut command. The "x y" values specified are offsets within the object supplied by the DOM. |

C. Page Element/Event Stimulation

Once a DOM element is identified, the playback process can take actions on it provided that it is an element that is able to accept actual or simulated user activity.

1. Representative Implementation

In the representative implementation the page element/event simulation activity is performed with a command that includes as parameters the necessary information to identify the action to be taken and the location at which it is to be taken. The command syntax below illustrates how this is accomplished in the representative implementation, but alternative implementations will vary in regard to syntax and semantics but accomplish the same effect.

| COMMAND SYNTAX | EXPLANATION |
|---|---|
| IndexElementEvent wid "event_name" "property_name" "property_value" [ "property_name" "property_value" ] ... "frame_path" [NAV] | This command involves specifying an event_name and a sequence of "property_name" "property_value" in pairs. Complete details on how these parameters work in actual practice are given below. |

2. Command Explanation

Here is an explanation of how this command works in a practical realization.

1. Command Pairs

The ["string" "string" ] . . . notation means that you can have as many pairs as you wish. The following syntax examples are correct:

1. IndexElementEvent wid "event_name" "property_name" "property_value" "frame_path"
2. IndexElementEvent wid "event_name" "property_name" "property_value" "property_name" "property_value" "frame_path" NAV
3. IndexElementEvent wid "event_name" "property_name" "property_value" "property_name" "property_value" "property_name" "property_value" "frame_path"

The following syntax examples are invalid:

1. IndexElementEvent wid "event_name" "frame_path"
2. IndexElementEvent wid "event_name" "frame_path" NAV The example below is valid syntactically, but may produce playback errors:

1. IndexElementEvent wid "event_name" "property_name" "frame_path" NAV

This example has five parameters, which follow the form of the first valid syntax example above. It is assumed that "frame_path" is a property value and "NAV" as the frame_path.

2. Parameters

The main parameters of this command are the name of the event and the descriptions of the actions to take. Actions are described in name=value pairs, of which there can be any number (as indicated by the [ ] . . . notation in the command definition). Here are the specifics:

a. Event Name:

The event_name, which can be taken from the following list, specifies the kind of event that is to be fired:

onabort, onblur, onchange, onclick, ondblclick, onerror, onfocus, onkeydown, onkeypress, onkeyup, onload, onmousedown, onmousemove, onmouseout, onmouseover, onmouseup, onresend, onresize, onselect, onsubmit, onunload Note that there could be other events that could be used here, depending on how the page is constructed. The above list is only a suggestion and may not be complete.

b. Action Description:

The action(s) to be taken are specified in terms of a pair of parameters: property_name, property_value.

These values may only occur in pairs and can be only taken from the following combinations and options. The values given below are the exact ones to use; all values shown are case-sensitive. All other combinations and options, including empty strings, are ignored without issuance of Warnings or Errors during playback.

1. altKey—sets the state of the ALT key:
   true—ALT key is not pressed
   false—ALT key is pressed
2. button—sets the mouse button pressed by the user. Possible values are:
   0—No button is pressed.
   1—Left button is pressed.
   2—Right button is pressed.
   3—Left and right buttons are both pressed.
   4—Middle button is pressed.
   5—Left and middle buttons both are pressed.
   6—Right and middle buttons are both pressed.
   7—All three buttons are pressed.
3. clientX, clientY—sets the x-coordinate or y-coordinate of the mouse pointer's position relative to the client area of the window, excluding window decorations and cross bars. The value is a long integer expressed in pixels.
4. ctrl Key—sets state of the CTRL key. Possible values are:
   true—CTRL key is not pressed
   false—CTRL key is pressed.
5. ctrlLeft—sets state of the left CTRL key. Possible values are:
   true—Left CTRL key is not pressed
   false—Left CTRL key is pressed.
6. offsetX, offsetY—sets the x-coordinate or y-coordinate of the mouse pointer's position relative to the object firing the event. The value is a long integer expressed in pixels.
7. propertyName—sets the name of the property that changes on the objects.
8. qualifier—sets the name of the data member provided by a data source object.
9. reason—sets the result of the data transfer for a data source object. Possible values:
   0—Data transmitted successfully
   1—Data transfer aborted.
   2—Data transferred in error.
10. repeat—sets whether the onkeydown event is being repeated. Possible values are:
    true—event fires two or more times.
    false—event fires once.
11. screenX, screenY—sets the x-coordinate or y-coordinate of the mouse pointer's position relative to the user's screen. The value is a long integer expressed in pixels.
12. shiftKey—sets the state of the SHIFT key. Possible values are:
    true—SHIFT key is not pressed
    false—SHIFT key is pressed.
13. srcUrn—sets the Uniform Resource Name (URN) of the behavior that fired the event. Possible values are:
    NULL—default only, cannot be changed.
14. This property is set to NULL unless both of the following conditions are true:
    A behavior currently is attached to the element on which the event is fired.
    The behavior defined in the preceding bullet has specified a URN identifier and fired the event.
15. x, y—sets the x-coordinate, or y-coordinate, in pixels, of the mouse pointer's position relative to a relatively positioned parent element. The value is a long integer.
16. cancelBubble—set whether the current event should bubble up the hierarchy of event handlers. Possible values are:
    "false": Bubbling is enabled. The next event handler in the hierarchy will receive the event.
    "true": Bubbling is disabled. The next event handler in the hierarchy will not receive the event.
17. keyCode—sets the Unicode key code associated with the key that caused the event. The property value parameter is a number. It is 0 if no key caused the event.
18. returnValue—sets the return value from the event; valid property values: "true" and "false".

D. Page Element Validation

Once pages are downloaded, the need for regression testing requires the ability to confirm that particular values are present as required. Such validations steps are also called "checkpoints" or "matchpoints". Prior art has provided for the ability to confirm text entries on a page as rendered, but in many practical cases the need for validation extends into the content of the page itself. The present invention extends the notion of validation to include any kind of Document Object Model (DOM) property or attribute taking on any pre-specified value. When the required value is found the corresponding test playback PASSes; when a required value is not found the corresponding test playback FAILs.

1. Representative Implementation

As the command syntax shows below, in the representative implementation the user can specify the object to be validated in several different ways, with more or less detail. Three typical formats for this command are shown, but other variations are possible within the concept identified by this action.

| DOM Element Value Extraction/Insertion Commands | |
|---|---|
| COMMAND SYNTAX | EXPLANATION |
| ValidateSelectedObjProperty wid idx [["id_name"] "id_value"] name value "frame_path"<br>[1] ValidateSelectedObjProperty wid idx name value "frame_path"<br>[2] ValidateSelectedObjProperty wid idx ["id_value"] name value | Validates the specific content of the described DOM object in the indicated frame (as specified by the frame_path). Details of the available names are usually found using the eValid PageMap facility. |

-continued

| DOM Element Value Extraction/Insertion Commands | |
|---|---|
| COMMAND SYNTAX | EXPLANATION |
| "frame_path" [3] ValidateSelectedObjProperty wid idx [["id_name"] "id_value"] name value "frame_path" | If the object found at idx does not have the given name, or if name is correct and the value the name currently has is incorrect, or if name is not found, an ERROR results. If the object with ID equal to id_value exists and the name has the specified value, or if name is correct and the value the name currently has is incorrect, or if name is not found, an ERROR results. If the object with object id_name equal to id_value exists and the name has the specified value, or if name is correct and the value the name currently has is incorrect, or if name is not found, an ERROR results. |

E. Page Get/Put Operations

The user may wish to read and/or set the values selected by the searches given above. This is done with special Get/Put commands, illustrated in a typical syntax below.

1. Representative Implementation

Here are typical commands that implement the functional described above, expressed in the standard command format. The command syntax below illustrates how this is accomplished in the representative implementation, but alternative implementations will vary in regard to syntax and semantics but accomplish the same effect.

| DOM Element Value Extraction/Insertion Commands | |
|---|---|
| Working Assumptions About These Commands: | |
| There is only one elementValue known to eValid at any time. The elementValue is always a string. The initial value of the elementValue is always set to empty. The value of the elementValue persists between pages, as long as the current playback is running. Commands that use this [internally stored] elementValue value always refer to the current page. eValid does not modify the elementValue except by action of the commands below. | |
| COMMAND SYNTAX | EXPLANATION |
| ValueSet value | Sets the elementValue to the specified value. |
| ValueGetElement wid name "frame_path" | Gets the value of the named element at sourceIndex and saves it in elementValue. If the object found at sourceIndex does not have the given name, or if name is correct and the value the name currently has is incorrect, or if name is not found, an ERROR results. |
| ValuePutElement wid name "frame_path" | Inserts the current elementValue into the specific attribute of the described DOM object in the indicated frame (as specified by the frame_path). |
| ValueSave "filename" [APPEND] | Saves the elementValue into the specified filename. If APPEND is present, the value is placed at the end of the named file. in the indicated frame (as specified by the frame_path) into the current elementValue. |

F. Page Navigation Header Manipulation

To support a wide range of different browser options one needs to be able to manipulate the "headers", the pre-request and post-request information at the HTTP/S level. This lets the representative implementation imitate other browsers and do other test-related manipulations of how the interaction between the test enabled web browser and the server operate.

A characteristic of the implementation of this feature is that the test enabled web browser is that searches are made for objects of specified properties on the current page, the identified location can be moved ahead or behind the found object's location, and a variety of user input actions can then be applied to accurately and reliably reproduce the effect of human input.

1. Operational Introduction

In some cases it is necessary to modify the HTTP header information, e.g. for monitoring or for special effects. This is done by editing the data required as an extra argument on a GotoLink command. Header information is contained in a single string. Sets the current value of the header with name to value to the specified string for the current playback up to the next InitLink or GotoLink command, after which the values are reset to "normal/default."

The values possible in the headers string are those that are used in standard HTTP/S protocol passages. Whether a specific header name is accepted with effect by a specific server can only be determined by experimentation.

| GotoLink Command Description With Header String Processing | |
|---|---|
| COMMAND SYNTAX | EXPLANATION |
| GotoLink wid "URL" "frame_path" ["header_string"] GotoLinkSubmit wid "URL" "frame_path" ["header_string"] | Goes to the specified URL with the browser, waits for the page to come up (if it can within the required minimum time), and gives control back to the user. If the WebSite has frames active then the recording includes the frame_path of the frame; on playback this is the frame to which the browser is pointed with the URL. This action is the same as typing in a URL and pressing RETURN. The header_string, if used, must separate multiple HTTP header strings with newline characters, e.g. User-id: identifier \n User-Password: something |

2. Suggested Usages

Here is a typical instance of use of this command to apply modified headers:

GotoLink 0 "www.cnn.com" "" "USER: name \n PASSWORD: pass \n SessionID: 654321"

3. Modifying the User Agent String

One example of the use of this feature is to set the User-Agent name to spoof the current test enabled web browser to appear to be a different kind or type of browser and thus to force the server to deliver pages as if eValid were that type of browser. Note: There is also an available SetUserAgent editable command that has some of the same effects. The table below specifies some command values for this.

| OS | Browser | Typical User-Agent String Definition |
|---|---|---|
| Windows 98 | IE 5.0 | Mozilla/4.0 (compatible; MSIE 5.0; Windows 98; I) |
| Windows 98 | IE 5.5 | Mozilla/4.0 (compatible; MSIE 5.5; Windows 98; I) |
| Windows 98 | Netscape 4.5 | Mozilla/4.5 [en]C-CCK-MCD {CADGraphicArts} (Win98; I) |
| Windows 98 | AOL 6.0 | Mozilla/4.0 (compatible; MSIE 5.01; MSN 2.5; Windows 98) |
| Windows 98 | Netscape 6.0 | Mozilla/5.0 (Windows; U; Win98; en-US; m18) Gecko/20001108 Netscape6/6.0 |
| Windows NT | IE 5.0 | Mozilla/4.0 (compatible; MSIE 5.0; Windows NT;) |
| Windows NT | IE 5.5 | Mozilla/4.0 (compatible; MSIE 5.5; Windows NT;) |
| Solaris 2.5.1 | IE 5.0 | Mozilla/4.0 (compatible; MSIE 5.0; SunOS 5.5.1 sun4m; X11) |
| Solaris 2.6 | IE 5.0 | Mozilla/4.0 (compatible; MSIE 5.0; SunOS 5.6 sun4u; X11) |

G. DOM-Based Adaptive Playback

The adaptive playback feature keeps tests from failing due to inconsequential changes in the underlying web page. Without adaptive playback, tests can be too "brittle" to be practical emulations of human input, which easily adapts to slightly changed page conditions.

Previously adaptive playback commands did not take as strong advantage as possible through use of the unique DOM property called ID, which is increasingly used in modern web page development (the ID property of each page element is given a "permanent" name automatically).

This enhanced capability operates in parallel with and in concert with other activities that may be going on inside the browser (based on the use by the test enabled web browser of standard browser components and the standard DOM available within such browsers).

H. Programming Language Interface

Here is an explanation of how this command works in the practical realization of the invention.

The automatic conversion of a recorded script into a programming language means that, to the user, a test enabled browser can record into a full programming language.

A characteristic of the implementation of this feature is that the resulting program, which can be expressed in a variety of programming language, e.g. C++ or PERL or C# or Visual Basic, etc., has the capability of full programmability, thus providing the test script with the power and flexibility available from the programming language in which the playback sequence is embedded.

1. Representative Implementation

Use of the programmatic interface feature will allow a user to convert an actual test enabled browser script into a form that can be incorporated into:

A PERL execution using a test enabled browser PERL support library.

A C++ program execution using a test enabled browser C++ support library.

A VB, or C#, or other language used to interface into the support library.

Hence, the script used within the representative implementation is effectively converted into a sequence of function calls or method invocations that are meaningful in the underlying API for the test enabled browser in that language context. Accordingly, a script that drives the test enabled web browser can equivalently be implemented operationally in a free-standing computer program whose execution is identical to the scrip-driven behavior, and visa versa.

2. Advantages

Playback of scripts is semi-static in that—by design—the scripting language is simple, generic, agnostic, and is not cluttered with unnecessary programming language details. The result is a scripting system that is a good compromise between expressive power and clarity and ease of use.

However, in some cases the availability of the full power of a procedure oriented language offers the website tester a significant example. For example, using test engine function calls from within a programming language would allow for the use of loops, data structures, conditional executions, extraction of values, etc.

3. Operating Mode

Here is how this process works (for C++ or PERL, for illustration purposes):

a. Record and perfect your script.evs with the representative implementation using the record facility and possibly augmented with manual edits of the script.

b. When the script is deemed ready, invoke the script conversion option and select the target language/environment.

c. Play the script back and observe that the converted script is now stored in new files named "script.evs.pl" or "script.evs.cpp."

d. Each generated file is a "fragment" of code that can be dropped directly into a PERL wrapper or a CPP wrapper.

e. The test enabled web browser commands, converted into PERL or CPP, are "function calls/method calls" into the CPP or PERL interface library that responds to them identically as if they commands were run in the test enabled web browser.

f. The wrapper program, in CPP or PERL, is free-standing and contains ALL of the interface logic required to have the test enabled browser behave according to the instructions in the sequence of function calls/method invocations.

g. If you do nothing else to the script at this point but simply run the PERL or CPP program then you will have the identically same effect as running the script in the test enabled web browser.

h. You have the option, if you wish, to add logic, and data structures, and whatever other kind of programming detail you want to add in the same programming language.

I. URL Sequence Capture

Playback of a script involves download of several parts of a page when the browser navigates to the page. This feature extracts the actual URL sequence (from data which the test enabled browser already has) and presents it as a working eValid script that can be better used in LoadTest runs.

A characteristic of the implementation of this feature is that the test enabled web browser can emulate the sequence of URL downloads without needing to completely browse and render each page, a characteristic that has primary application in creation of equivalent protocol loading on a server, as if the test enabled browser were running independently.

1. Representative Implementation Behavior

The basic idea of this feature is to create, at script playback time, a complete derived URL trace, in a format ready to be submitted to an associated utility program that retrieves specified URLs using the HTTP/S protocol. The derived trace shows all of the URLs from that actual playback but does not represent coherent state-preserving activity.

2. Overview of Operation

When used in the associated URL retrieval utility, the derived URL trace file will visit all of the URLs that an actual playback will visit—but without any browsing of pages (i.e. no rendering, creation of DOM, etc). Such a URL trace playback will therefore replicate the full sequence of URLs that are downloaded in browser playback—including intra-command wait times—but with "reduced fidelity". The derived URL trace script can be expected to play back at a faster speed than the full, normal mode, playback because the test enabled browser is doing significantly less work.

3. Operational Procedure

The procedure to use this feature in the representative implementation is as follows:

1. Select the script that you want to process, e.g. script.evs.
2. Turn on the Detailed Timings option and also turn on the Create URL Trace option.
3. Play back the original script. The conversion process is accomplished during actual playback to assure the accuracy of the URL sequence extraction.
4. The resulting derived URL trace script will be saved as "URL.script.evs".
5. The URL trace script has the usual headers, has a "Serve URL" at the front of the script, and has a "Serve FULL" at the end.
6. Load the derived URL trace script in this form to confirm the results.
7. An eVlite run of "URL.script.evs" now will mimic the same sequence of URL downloaded in the original "script.evs".

4. Example of Script Conversion

Here is an example of the effect of the transformation of a regular test enabled web browser script into a derived URL trace script.

Original Script

```
##############################################################
###########
# Original Script
...
ResetTimer
InitLink "http://www.domain.com/Playback/URL.trace.html"
ElapsedTime
...
```

Derived Script

```
##############################################################
#######
# URL trace script derived from script.evs
...
ResetTimer
GetURL "http://www.domain.com/Playback/URL.trace.html"
GetURL "http://www.domain.com/Parts/newevalid.css"
GetURL "http://www.domain.com/Images/evalid_logo_white_trsp_top_100x52.gif"
GetURL "http://www.domain.com/Images/evback.gif"
ElapsedTime
...
```

J. Page Analysis and Structure Extraction

Detailed DOM scanning yields dynamically created links. The key is that eValid does the scan "over the wire" and "from the client perspective"—a significant technical advantage.

Access to the DOM for analytic purposes is assured because the test enabled web browser uses standard browser components, among which is an interface to the DOM for each page that is browsed.

A characteristic of the implementation of this feature is that the resulting spidering of the web page is dependent on how the page actually exists at the time it is served to the test enabled web browser, and does not include or exclude any details or effects that are pertinent to the structure, organization, layout, and content of said web page.

1. Dynamic Creation of Internal Work List

More selective inclusion and exclusion of links in the work-to-be-done list/tree. This is important to a successful and useful scan, being able to decide based on page properties, mainly the URL but also on other internal criteria, whether to add it to the work list. If you do not do this you would have to scan everything you find, and you may not want that. User control is important.

The criteria for inclusion and exclusion are inclusive of any property of the page, its component elements, it's DOM properties, and its links to other pages. All of this information is available because the test enabled web browser uses standard browser components, among which is an interface to the DOM for each page that is browsed.

A characteristic of the implementation of this is that the origin of the search process described above can be determined by the user, so that the search can be made of one or more websites or sub-websites, as specified by a starting or "root" URL and as constrained according to the claimed limits and constraints, so that data can be collected on full websites or sub-websites according to the wishes and expectations of the user.

Within the context of the search, the following criteria can be applied to include or exclude individual pages based on the following criteria:

a. The specific character strings used in the URL, which can be specified as case-sensitive or not;
  b. Whether or not the page shares the domain with the specified root domain;
  c. Whether the domain name is found on a list of permitted domains;
  d. An analysis of scripts within the current page;
  e. Analysis of objects within the current page;
  f. The protocols (HTTP/S and non-HTTP/S) used to retrieve the page;
  g. The type of page extension used:
  h. The content of query strings that may be associated with the URL.
  i. The accumulated depth of dependence chains in the scan:
  j. The total time consumed in the scan;
  k. The total number of pages examined;

l. The total number of page to page dependency links accumulated in the scan;

m. The total volume of data downloaded in the scan;

n. Whether the page was previously visited in the scan;

o. The response to a user-supplied program that analyzes the entire content of the page, as supplied to it by the invention in the same pure-HTML form it was used for internal automated analysis.

2. Detailed Page Analysis for Properties

Detailed analysis of DOM properties immediately follows from #1 above. The idea is, the text enabled browser can see in the pages in complete detail, extract anything, and use that in website comparison activities.

The analysis of properties is assured because of the architecture of the test enabled web browser. All of this information is available because the test enabled web browser uses standard browser components, among which is an interface to the DOM for each page that is browsed.

A characteristic of the implementation of this feature is that that the information that is collected and stored in a database is available using standard browsing components and standard DOM models, such as are typically employed in available general purpose web browsers of several kinds and types.

3. Dependency Lists Generated Internally

Page to page dependency capture based on the dynamic links within the current page follows from #1 above. The page to page dependency tree can be kept internally in a linked list of parent-child dependencies. The his claim also incorporates the notion of a subwebsite, being those pages at/below an established root.

A characteristic of the implementation of this feature is that the interface between the analysis function and the database function is one that uses standard database interface components, such that alternative database systems can be used to contain the information that is captured without any loss of information or content.

The various aspects, features, embodiments or implementations of the invention described above can be used alone or in various combinations.

The invention can be implemented by software, hardware, or a combination of hardware and software. The invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computing device, comprising:
a memory;
web browser program code stored in the memory; and
a processor configured to perform the web browser program code,
wherein the web browser program code, when performed, provides a web browser operating on the computing device,
wherein the web browser program code provides the web browser with Document Object Model (DOM) access capabilities,
wherein the web browser program code, executable by the computing device, includes at least:
  computer program code for testing and analysis of a web page as rendered by the web browser;
  computer program code for accessing an attribute or property value of an element of a DOM of the web page, wherein the computer program code for accessing the attribute or property value of the element of the DOM of the web page accesses the DOM of the web page using a browser programming interface that enables the web browser program code to have access to the DOM, the browser programming interface is supported by an API underlying the web browser program code for providing a plurality of library function calls or methods that are accessible by the web browser program code, and wherein the computer program code for accessing the attribute or property value of the element of the DOM of the web page accesses the attribute or property value of the element of the DOM of the web page for purposes of the testing and analysis of the web page rendered in the web browser,
wherein the web browser program code supports at least one command, provided to the web browser via the browser programming interface, to facilitate synchronized testing and analysis of asynchronous processes of the web page rendered by the web browser using the underlying API, and
wherein the at least one command includes a DOM index value, a DOM property name and a DOM property value, and causes examination of a name and a value of a property found in the DOM of the web page at the DOM index value to determine whether the name and the value match the DOM property name and the DOM property value, respectively.

2. A computing device as recited in claim 1,
wherein the web browser program code, executable by the computing device, includes at least:
  computer program code for receiving an indication of a DOM modification to be performed, and
wherein the computer program code for accessing the attribute or property value of the element of the DOM of the web page comprises computer program code for modifying the attribute or property value of the element of the DOM of the web page for purposes of the testing and analysis of the web page rendered in the web browser.

3. A computing device as recited in claim 2, wherein the indication of the DOM modification to be performed is received from the memory or from a user of the computing device.

4. A computing device as recited in claim 2, wherein the DOM modification sets an attribute of the element of the DOM of the web page to a particular value.

5. A computing device as recited in claim 1, wherein access to the DOM of the web page by the web browser program code for the testing and analysis of the web page rendered in the web browser uses only the web browser program code and the API underlying the web browser program code.

6. A computing device as recited in claim 1, wherein the examination of the name and the value of a property found in the DOM at the DOM index value repeats until the name and the value match the DOM property name and the DOM property value, respectively.

7. A computing device as recited in claim 6,
wherein the least one command includes a maximum time value, and
wherein the examination of the name and the value of a property found in the DOM at the DOM index value no longer repeats once the maximum time value is exceeded.

8. A computing device as recited in claim 6, wherein the examination of the name and the value of a property found in the DOM at the DOM index value repeats until the name and the value fail to match the DOM property name and the DOM property value, respectively.

9. A computing device as recited in claim 8,
wherein the least one command includes a maximum time value, and
wherein the examination of the name and the value of a property found in the DOM at the DOM index value no longer repeats once the maximum time value is exceeded.

10. A non-transitory computer readable medium including at least computer program code operational on a computer for providing a web browser, said computer readable medium comprising:
computer program code for providing web browsing capabilities and testing capabilities for a website being hosted by a server and accessible to the computer via a network, the website including at least one web page,
wherein the computer program code for providing web browsing capabilities and testing capabilities, when performed, provides the web browser with Document Object Model (DOM) access capabilities, and
wherein the computer program code for providing web browsing capabilities and testing capabilities includes at least:
computer program code for testing and analysis of a web page as rendered by the web browser; and
computer program code for accessing an attribute or property value of an element of a DOM of the web page, wherein the computer program code for accessing the attribute or property value of the element of the DOM of the web page accesses the DOM of the web page using a browser programming interface that enables the computer program code for providing web browsing capabilities and testing capabilities to have access to the DOM, the browser programming interface is supported by an API underlying the computer program code for providing web browsing capabilities and testing capabilities for providing a plurality of library function calls or methods that are accessible by the computer program code for providing web browsing capabilities and testing capabilities, wherein the computer program code for accessing the attribute or property value of the element of the DOM of the web page accesses the attribute or property value of the element of the DOM of the web page for purposes of the testing and analysis of the web page rendered in the web browser, and wherein the computer program code for providing web browsing capabilities and testing capabilities supports at least one command, provided to the web browser via the browser programming interface, to facilitate synchronized testing and analysis of asynchronous processes of the web page rendered by the web browser using the underlying API, and
wherein the at least one command includes a DOM index value, a DOM property name and a DOM property value, and causes examination of a name and a value of a property found in the DOM of the web page at the DOM index value to determine whether the name and the value match the DOM property name and the DOM property value, respectively.

11. A non-transitory computer readable medium as recited in claim 10,
wherein the computer program code for providing web browsing capabilities and testing capabilities includes at least:
computer program code for receiving an indication of a DOM modification to be performed; and
wherein the computer program code for accessing the attribute or property value of the element of the DOM of the web page comprises:
computer program code for accessing a DOM pertaining to a web page of the website to locate an attribute or property value of an element of the DOM of the web page; and
computer program code for modifying the attribute or property value of the element of the DOM of the web page in accordance with the indication of the DOM modification to be performed.

12. A non-transitory computer readable medium as recited in claim 11, wherein the indication of the DOM modification to be performed is previously stored to and then received from the computer.

13. A non-transitory computer readable medium as recited in claim 11, wherein the DOM modification sets an attribute of the element of the DOM of the web page to a particular value.

14. A non-transitory computer readable medium as recited in claim 11, wherein the computer program code for modifying the attribute or property value of the element of the DOM of the web page modifies the attribute or property value of the element of the DOM of the web page for purposes of the testing and analysis of the web page rendered in the web browser.

15. A non-transitory computer readable medium as recited in claim 10,
wherein the computer program code for testing and analysis of a web page as rendered by the web browser operates to perform functional testing and validation, and
wherein the testing and analysis of the web page rendered by the web browser includes analysis of performance of the web browser in rendering the web page.

16. A non-transitory computer readable medium as recited in claim 10, wherein the computer program code for providing web browsing capabilities and testing capabilities includes at least:
computer program code for supporting at least one user input command, provided to the web browser via the browser programming interface, to simulate an event action being received at the web browser to thereby facilitate testing and analysis of the web page rendered by the web browser.

17. A non-transitory computer readable medium as recited in claim 16, wherein the at least one user input command is an element click command.

18. A non-transitory computer readable medium as recited in claim 16, wherein the at least one user input command is a mouse related command.

19. A non-transitory computer readable medium as recited in claim 10, wherein access to the DOM of the web page by the computer program code for the testing and analysis of the web page rendered in the web browser uses only the computer program code for providing web browsing capabilities and testing capabilities and the underlying API.

20. A non-transitory computer readable medium as recited in claim 10, wherein the examination of the name and the value of a property found in the DOM at the DOM index value repeats until the name and the value match the DOM property name and the DOM property value, respectively.

21. A non-transitory computer readable medium as recited in claim 20,
wherein the least one command includes a maximum time value, and
wherein the examination of the name and the value of a property found in the DOM at the DOM index value no longer repeats once the maximum time value is exceeded.

22. A non-transitory computer readable medium as recited in claim 20, wherein the examination of the name and the value of a property found in the DOM at the DOM index value repeats until the name and the value fail to match the DOM property name and the DOM property value, respectively.

23. A non-transitory computer readable medium as recited in claim 22,
wherein the least one command includes a maximum time value, and
wherein the examination of the name and the value of a property found in the DOM at the DOM index value no longer repeats once the maximum time value is exceeded.

24. A non-transitory computer readable medium including at least computer program code operational on a computer for providing a web browser, said computer readable medium comprising:
computer program code for providing web browsing capabilities and testing capabilities for a website being hosted by a server and accessible to the computer via a network, the website including at least one web page,
wherein the computer program code for providing web browsing capabilities and testing capabilities, when performed, provides the web browser with Document Object Model (DOM) access capabilities, and
wherein the computer program code for providing web browsing capabilities and testing capabilities includes at least:
computer program code for testing and analysis of a web page as rendered by the web browser; and
computer program code for accessing an attribute or property value of an element of a DOM of the web page, wherein the computer program code for accessing the attribute or property value of the element of the DOM of the web page accesses the DOM of the web page using a browser programming interface that enables the computer program code for providing web browsing capabilities and testing capabilities to have access to the DOM, the browser programming interface is supported by an API underlying the computer program code for providing web browsing capabilities and testing capabilities for providing a plurality of library function calls or methods that are accessible by the computer program code for providing web browsing capabilities and testing capabilities, wherein the computer program code for accessing the attribute or property value of the element of the DOM of the web page accesses the attribute or property value of the element of the DOM of the web page for purposes of the testing and analysis of the web page rendered in the web browser, and wherein the computer program code for providing web browsing capabilities and testing capabilities supports at least one command, provided to the web browser via the browser programming interface, to facilitate synchronized testing and analysis of asynchronous processes of the web page rendered by the web browser using the underlying API, and
wherein the at least one command includes a DOM index value, a DOM property name and a DOM property value, and causes search of the DOM of the web page beginning at the DOM index value for a name and a value of a property found in the DOM at the DOM index value to determine whether the name and the value match the DOM property name and the DOM property value, respectively.

25. A non-transitory computer readable medium as recited in claim 24, wherein if no match is found at the DOM index value, the search continues by incrementing the DOM index value and then checking the name and the value of a property found in the DOM at the incremented DOM index value for match with the name and the value match the DOM property name and the DOM property value, respectively.

26. A computing device, comprising:
a memory;
web browser program code stored in the memory; and
a processor configured to perform the web browser program code,
wherein the web browser program code, when performed, provides a web browser operating on the computing device,
wherein the web browser program code provides the web browser with Document Object Model (DOM) access capabilities,
wherein the web browser program code, executable by the computing device, includes at least:
computer program code for testing and analysis of a web page as rendered by the web browser;
computer program code for accessing an attribute or property value of an element of a DOM of the web page, wherein the computer program code for accessing the attribute or property value of the element of the DOM of the web page accesses the DOM of the web page using a browser programming interface that enables the web browser program code to have access to the DOM, the browser programming interface is supported by an API underlying the web browser program code for providing a plurality of library function calls or methods that are accessible by the web browser program code, and wherein the computer program code for accessing the attribute or property value of the element of the DOM of the web page accesses the attribute or property value of the element of the DOM of the web page for purposes of the testing and analysis of the web page rendered in the web browser, wherein the web browser program code supports at least one command, provided to the web browser via the browser programming interface, to facilitate synchronized testing and analysis of asynchronous processes of the web page rendered by the web browser using the underlying API, and wherein the at least one command includes a DOM index value, a DOM property name and a DOM property value, and causes search of the DOM of the web page beginning at the DOM index value for a name and a value of a property found in the DOM at the DOM index value to determine whether the name and the value match the DOM property name and the DOM property value, respectively.

27. A computing device as recited in claim 26, wherein if no match is found at the DOM index value, the search continues by incrementing the DOM index value and then checking the name and the value of a property found in the DOM at the incremented DOM index value for match with the name and the value match the DOM property name and the DOM property value, respectively.

28. A computing device as recited in claim 26, wherein the web browser program code, executable by the computing device, includes at least:
computer program code for receiving an indication of a DOM modification to be performed, and wherein the computer program code for accessing the attribute or property value of the element of the DOM of the web page comprises computer program code for modifying the attribute or property value of the element of the DOM of the web page for purposes of the testing and analysis of the web page rendered in the web browser.

29. A computing device as recited in claim 28, wherein the DOM modification sets an attribute of the element of the DOM of the web page to a particular value.

* * * * *